May 25, 1926.
A. P. ANDERSON
REDUCING VALVE
Filed March 12, 1923
1,585,885
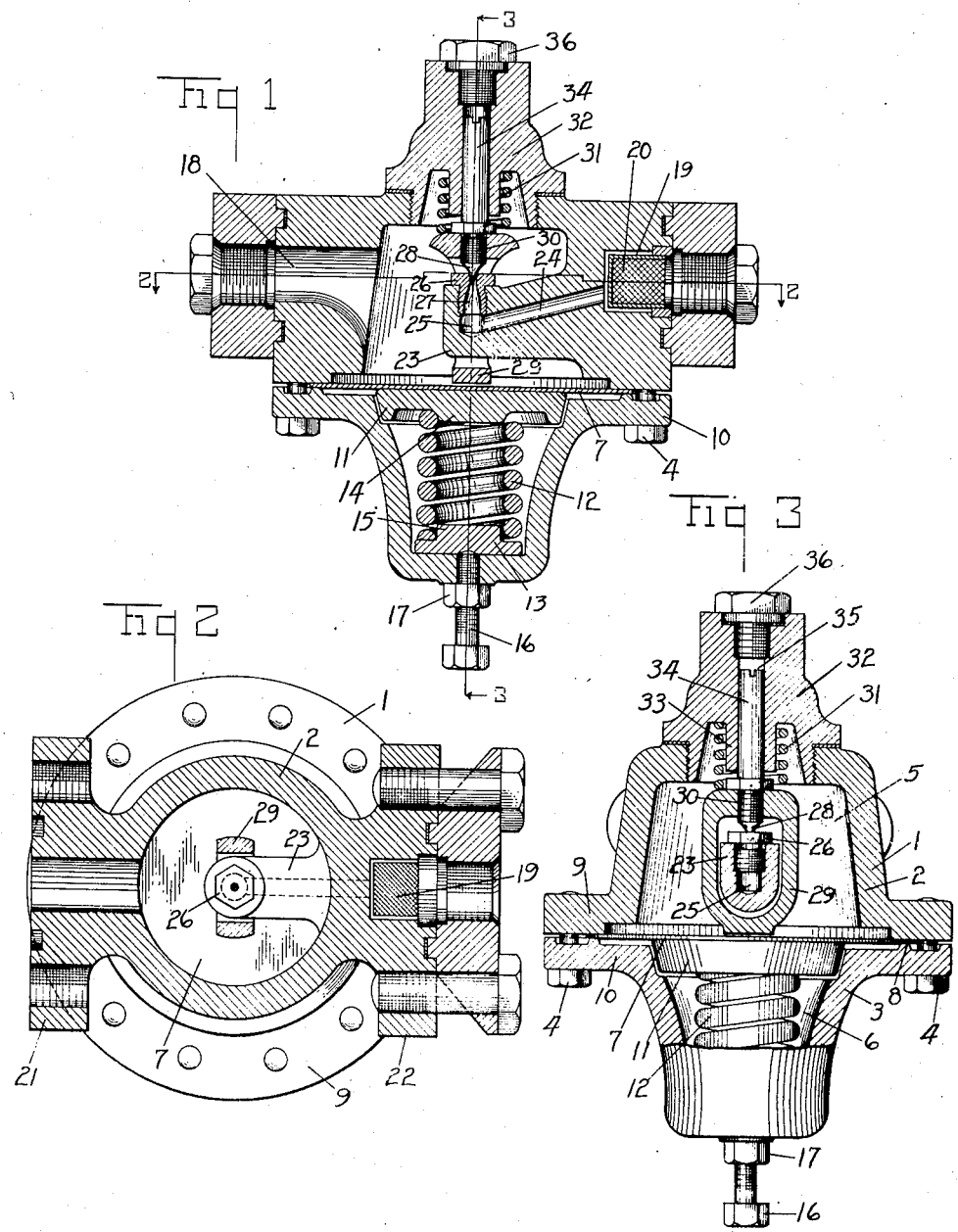
INVENTOR
August P. Anderson,
by
Owen, Owen & Crampton.

Patented May 25, 1926.

1,585,885

UNITED STATES PATENT OFFICE.

AUGUST P. ANDERSON, OF TOLEDO, OHIO.

REDUCING VALVE.

Application filed March 12, 1923. Serial No. 624,384.

My invention has for its object to provide an efficient automatic reducing valve wherein varying high pressures in a gas system will be admitted to other devices or parts of the system at such a rate as to produce a uniform pressure at the point of admission, such uniform pressure being less than that or equal to the minimum pressure that is thus controlled. The invention particularly has for its object to provide a valve simple in construction which will regulate the gas flow with great exactness and in such a way as to prevent local disturbance at the point of admission of the valve from one part of the system to the other part of the system. The invention also has for its object to so construct the parts of the valve that they may be readily assembled and taken apart and wherein particularly the controlling valve and its seat may be readily shaped, such as by grinding, in order to obtain an accurate seating or fitting of the said valve parts.

Valves containing my invention may partake of different forms in their details of construction. To illustrate a practical application I have selected a reducing valve containing the invention and shall describe it hereinafter. The structure selected is illustrated in the accompanying drawings.

Figure 1 of the drawings illustrates a vertical section through the valve. Fig. 2 illustrates a section taken on the line 2—2 indicated in Fig. 1, and Fig. 3 illustrates a vertical section taken on the line 3—3 indicated in Fig. 1.

The valve casing 1 is formed of the two parts 2 and 3 that are bolted together by suitable bolts 4. The casing 1 is divided into the chambers 5 and 6 that are separated from each other by means of the sheet metal diaphragm 7 which is secured between the two parts 2 and 3 of the casing. The part 3 is preferably provided with a ridge 8 that extends around the periphery of the part and the diaphragm 7 is clamped between the ridge and the flange 9 of the part 2. This leaves a small space between the flange 10 of the part 3 and the diaphragm 7 having a vertical dimension substantially that of the height of the ridge 8. This gives opportunity for the diaphragm 7 to move in response to the differences in pressure existing in the chambers 5 and 6.

In order that the pressure on the diaphragm on the side of the chamber 6 may be regulated a circular plate 11 extending over a greater portion of the area of the diaphragm and coaxial or substantially concentric therewith is located in the chamber 6. A spring 12 is located between the plate 11 and a circular block or disc 13. The plate 11 and the disc 13 may be provided with bosses 14 and 15 that engage the ends of the spring 12 to move the spring 12 in position. The tension of the spring 12 may be adjusted by means of the bolt 16 which is threaded into the lower end of the part 3 of the case 1. The bolt 16 may be pressed against the center of the disc 13 and thus the spring 12 may be compressed. The bolt 16 may be secured in its adjusted position by the nut 17.

The chamber 5 has an outlet 18 that may communicate with the part of the system or the devices that are to receive the uniform pressure that is automatically maintained by the valve. The part 2 of the casing 1 is provided with the inlet 19 in which is located a thimble shaped screen 20. The inlet of the valve communicates with the high pressure side of the system where gas of varying high pressure exists or may be produced and which is to be supplied to another part of the system through the valve, but at a uniform pressure. In order to secure the connection with the high pressure side as well as with the low pressure side, the part 2 of the valve casing 1 may be provided with suitable flanges or ears 21 and 22 whereby flanges located on the ends of the connected pipes may be secured to the casing.

The part 2 of the casing is provided with a protruding boss or arm 23 having the bore or hole 24 that communicates with the inlet 19. The arm 23 protrudes beyond the axis of the casing 1 and is provided with a tapped opening 25 that is located coaxial with the casing and extends from the top of the arm to the hole 24. A valve part 26 forming the outlet of the passageway formed by the holes 24 and 25 is threaded into the opening 25 of the arm 23. The valve member 26 forms the valve seat and is provided with an opening 27 extending therethrough which is much smaller at the top or seat of the valve than it is at the lower end of the member 26. The opening within the member 26 has substantially the same shape as the exterior of the well known beer bottle, that is, the opening will be defined by a pair of ogee lines curving towards each other in a section of the member. This form of opening produces a gradual restriction of the gas movement and prevents the setting up of vibratory pressure on the valve as the gas passes through the valve. I have discovered that where the outlet is either conical or is cylindrical that although the automatic valve may be properly set for regulation of the pressure, yet by reason of vibration set up by the escaping gas that the pressure may rise considerable above that for which the valve is set. The vibratory pressure that is thus created is not uniform in its action on the valve according to the pressure of the gas, but unforseen conditions may cause the vibratory condition to set up under certain circumstances where it will not exist under other circumstances, with the result that it is practically impossible to obtain an exact uniform regulation of the pressure. Where, however, the valve member forming the valve seat is provided with the opening described the regulation is uniform.

The movable valve member 28 is in the form of a needle that enters the opening 27. The needle 28 is somewhat conical in form, but has a shape substantially that of the surface produced by the rotation of a parabolic curve when located in the plane of and rotating about the axis of the valve member 28, whereby the gas passing from the opening formed in the valve member 26 will be distributed and guided to all parts of the chamber 5. Gas will thus follow curved paths upon leaving the opening 25 until it is distributed in the chamber 5 of the part 2 of the casing. The shape of the needle member 28 of the valve coacts to prevent local disturbance caused by the movement of the gas from the high pressure side of the valve to the low pressure side. The shape of the valve members 26 and 28 causes a gradual change of pressure from one side to the other and thus there is a uniform change in the rate of the flow at this connecting point.

The valve member 28 is connected to a yoke 29. It is formed integral with a threaded part 30 which is threaded into the upper end of the yoke 29. The yoke 29 surrounds the end of the arm 23 and is so shaped as to be freely movable with respect to the arm 23 except as it is controlled in its movements by the spring 31 and the diaphragm 7. The valve 28 is adjustably located in the upper end of the yoke 29 by the threaded part 30. The spring 31 is located between the top of the yoke 29 and the cap 32 which is threaded in the top of the part 2 of the valve case. A boss 33 may be formed in the cap 32 to hold the spring 31 in place. The valve member 28 is also provided with a stem 34 that fits an opening formed in the cap 32. The stem 34 is slidable within the opening as the stem 34 is moved either by the spring 31 or the diaphragm 7. The upper end of the stem 34 may be provided with a slot 35 whereby the stem 34 may be rotated. The opening in which the stem 34 is located may be closed by a plug 36. The valve member 28 may thus be adjusted with reference to the yoke 29 by a screw driver inserted in the slot 35 which will cause the rotation of the threaded part 30 in the yoke 29. A spring 31 operates to seat the valve when the yoke 29 is lowered by the depression of the diaphragm 7.

In the operation of the valve the opening between the valve members 26 and 28 is varied according to the pressure in the chamber 5 which is maintained practically constant, since if it varies in the very slightest degree either the opening afforded by the valve members 26 and 28 will be reduced or increased by the pressure of the diaphragm 7 upon the yoke 29 or by the pressure of the spring 31 upon the yoke 29.

In order to maintain a uniform pressure at the outlet of the valve the valve members must have not only the required shapes, but also there should be a perfect fitting of the parts in order that the opening may be uniformly varied to produce uniform change in the rate of gas movement. The construction provided by my invention affords means whereby these two parts may be provided with outlet surfaces or edges that will fit if the valve is placed in closed position. The valve members may be ground together after they have been placed in their positions in the valve casing. This is done by removing the cap 32 from the case, whereupon the yoke 29 may be removed by tilting the stem 34 so as to permit the lower edge of the yoke to pass over the end of the arm 23. The yoke and the valve member 28 are then removed through the top of the case. The yoke is then disconnected from the threaded part 30 of the valve and after the plug 36 is removed the stem 34 is inserted in the cap 32 and the cap 32 is replaced on the case. This places the valve member 28 in the valve member 26. The valve member 28 may thus be pressed against the upper end of the valve member 26 and rotated by a screw driver in order to make the surfaces of the valve members conform with exactness. When this has been done the yoke 29 may be replaced and the parts reassembled, and if desired the spring 12 may be readjusted to produce the required uniform pressure at the outlet of the valve.

I claim:

1. In a reducing valve, a pair of valve members, one forming the valve seat and the other forming the movable valve part, the valve seat having an opening extending therethrough and having a substantially conical surface corresponding to a surface formed by the rotation of an ogee line about the axis of the member, the movable part having a substantially conical surface.

2. In a reducing valve, a pair of valve members, one forming the valve seat and the other forming the movable valve part, the valve seat having an opening extending therethrough having a substantially conical surface corresponding to a surface formed by the rotation of an ogee line about the axis of the member, the movable part having a substantially conical surface that corresponds to a surface formed by the rotation of an inwardly curved line about the axis of the movable part of the valve.

3. In a reducing valve, a spring pressed diaphragm, a spring pressed yoke operated upon by the diaphragm, a cap secured to the valve casing, a stem located in the cap and adjustably connected to the yoke, a needle valve member connected to the stem, an arm projecting into the yoke, and a fixed valve member having an opening for receiving the movable valve member, the yoke being removable through the opening closed by the cap, the stem guided by the cap when the valve members are ground together.

In testimony whereof, I have hereunto signed my name to this specification.

AUGUST P. ANDERSON.